US011929638B2

(12) United States Patent
Søgaard et al.

(10) Patent No.: US 11,929,638 B2
(45) Date of Patent: Mar. 12, 2024

(54) FULL DC VOLTAGE POWER BACKUP SYSTEM FOR WIND TURBINE

(71) Applicant: VESTAS WIND SYSTEMS A/S, Aarhus N (DK)

(72) Inventors: Morten Bagger Søgaard, Thisted (DK); Niels Erik Danielsen, Brabrand (DK); Alun Jones, Hørning (DK); Carsten Lindgaard Jensen, Silkeborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 125 days.

(21) Appl. No.: 17/611,836

(22) PCT Filed: May 15, 2020

(86) PCT No.: PCT/DK2020/050138
§ 371 (c)(1),
(2) Date: Nov. 16, 2021

(87) PCT Pub. No.: WO2020/228918
PCT Pub. Date: Nov. 19, 2020

(65) Prior Publication Data
US 2022/0224145 A1 Jul. 14, 2022

(30) Foreign Application Priority Data
May 16, 2019 (DK) .......................... PA 2019 70313

(51) Int. Cl.
H02J 9/06 (2006.01)
F03D 7/02 (2006.01)
(Continued)

(52) U.S. Cl.
CPC ............ *H02J 9/061* (2013.01); *F03D 7/0264* (2013.01); *F03D 9/11* (2016.05); *H02J 1/106* (2020.01);
(Continued)

(58) Field of Classification Search
CPC ... H02J 9/061; H02J 1/106; F03D 9/11; F03D 7/0264; F05B 2270/1071; F05B 2270/337
(Continued)

(56) References Cited

U.S. PATENT DOCUMENTS 10,581,247 B1 * 3/2020 Kolhatkar ............... H02P 23/26
2011/0125336 A1 5/2011 Groves et al.
(Continued)

FOREIGN PATENT DOCUMENTS

CN 107005057 A 8/2017
CN 108604795 A 9/2018
(Continued)

OTHER PUBLICATIONS

Danish Patent and Trademark Office, 1st Technical Examination including The Search Report and Search Opinon for Application PA 2019 70313 dated Oct. 25, 2019.
(Continued)

*Primary Examiner* — Alfonso Perez Borroto
(74) *Attorney, Agent, or Firm* — Patterson + Sheridan, LLP

(57) ABSTRACT

The present invention relates to a wind turbine comprising an internal power supply grid for distributing power to a number of power consuming units of the wind turbine, the wind turbine further comprising a power backup system connected to the internal power supply grid for supplying power to said internal power supply grid during a grid fault, wherein the power backup system comprises a power storage module providing a total backup voltage that falls within
(Continued)

a nominal voltage range of the internal power supply grid of the wind turbine.

15 Claims, 2 Drawing Sheets

(51) Int. Cl.
    *F03D 9/11*     (2016.01)
    *H02J 1/10*     (2006.01)

(52) U.S. Cl.
    CPC . *F05B 2270/1071* (2013.01); *F05B 2270/337* (2013.01)

(58) Field of Classification Search
    USPC .......................................................... 307/64
    See application file for complete search history.

(56) References Cited

U.S. PATENT DOCUMENTS

| | | | |
|---|---|---|---|
| 2011/0215640 A1 | 9/2011 | Donnelly et al. | |
| 2013/0334818 A1* | 12/2013 | Mashal | F03D 7/0264 290/44 |
| 2014/0145439 A1* | 5/2014 | Burra | F03D 7/0204 290/44 |
| 2014/0361624 A1* | 12/2014 | Ault | H02J 9/062 307/65 |
| 2015/0108755 A1 | 4/2015 | Das et al. | |
| 2015/0108761 A1* | 4/2015 | Bala | H02P 9/42 290/54 |
| 2015/0235753 A1 | 8/2015 | Chatani et al. | |
| 2017/0133879 A1 | 5/2017 | Eckhardt et al. | |
| 2018/0306169 A1* | 10/2018 | Dharmadhikari | F03D 9/11 |
| 2018/0309318 A1* | 10/2018 | Dharmadhikari | H02P 9/007 |

FOREIGN PATENT DOCUMENTS

| | | |
|---|---|---|
| EP | 2282055 A2 | 2/2011 |
| EP | 2996219 A1 | 3/2016 |
| WO | 2009008863 A1 | 1/2009 |
| WO | 2013060013 A1 | 5/2013 |
| WO | 2018145801 A1 | 8/2018 |
| WO | 2020228918 A1 | 11/2020 |

OTHER PUBLICATIONS

PCT, International Search Report and Written Opinion of The International Searching Authority for Application PCT/DK2020/050138 dated: Aug. 3, 2020.

National Intellectual Property Administration (CNIPA) of The People's Republic of China, Notification of the First Office Action for Chinese Patent Application No. 202080050534.9, dated Dec. 27, 2023.

* cited by examiner

FULL DC VOLTAGE POWER BACKUP SYSTEM FOR WIND TURBINE

FIELD OF THE INVENTION

The present invention relates to a wind turbine comprising a power backup system for supplying power to an internal power supply grid of the wind turbine during a grid fault. In particular, the present invention relates to a power backup system providing a total backup voltage that matches a nominal voltage range of the internal power supply grid of the wind turbine.

BACKGROUND OF THE INVENTION

A wind power plant, also referred to as a wind park, typically includes a plurality of wind turbines, the generating outputs of which are networked to supply power to the national or regional utility grid. A modern wind turbine includes complicated electrical systems including numerous control units, switching equipment, cooling systems, lighting systems, actuators and hydraulic systems which require their own dedicated power supply. This power supply is fed from the utility grid typically via a transformer substation. Such a power supply may be termed an 'internal power supply grid', and its role is to manage and distribute a medium voltage power supply to the wind turbines and auxiliary equipment in the form of power consuming units within the wind power plant to ensure high availability of power generation.

In the event of a so-called grid loss where the wind turbine loses connectivity to the utility grid, the electrical systems of the wind turbines also lose their supply of power. In order to mitigate problems arising from such power loss, it is known to equip the wind power plant with a form of auxiliary power supply. This may take the form of a battery-based system or may be based on a diesel generator. For example, WO 2018/224110 A1 describes a system in which a rechargeable battery is used as a power backup system.

A power backup system may ensure that at some vital electrical systems of the wind turbines of the wind power plant remain operational even during a utility grid loss. It is known to operate a wind turbine where a rechargeable battery is charged during grid loss from a DC link of the main converter bridging the generator and the utility grid. However, this arrangement requires that the main converter is operated during the grid loss which inevitably will induce undesired losses in the form of switching losses.

Moreover, conventional internal power supply grids of wind turbines are typically configured to be operated at a plurality of voltage levels which indeed increases the complexity as wells as the installations costs of such internal power supply grids as well as the costs of associated power backup systems.

SUMMARY OF THE INVENTION

It may be seen as an object of embodiments of the present invention to provide a simple wind turbine power backup system being capable of providing essentially instant power backup to a wind turbine in case of an undesired grid fault, such as a grid loss or a temporary voltage drop.

The above-mentioned object is complied with by providing, in a first aspect, a wind turbine comprising an internal power supply grid for distributing power to a number of power consuming units of the wind turbine, the wind turbine further comprising a power backup system connected to the internal power supply grid for supplying power to said internal power supply grid during a grid fault, wherein the power backup system comprises a power storage module providing a total backup voltage that falls within a nominal voltage range of the internal power supply grid of the wind turbine.

In the present context a grid fault may be grid loss where the connection to the utility grid is lost, or it may be a temporary voltage drop where the connection to the utility grid is maintained although the grid voltage has dropped significantly.

As it will be discussed in further details below the following advantages are associated with the power backup system of the present invention as well as with a wind turbine comprising the power backup system:

1) The internal power supply grid of the wind turbine to which the power backup system is directly connected comprises only a DC bus being configured to operate at a relatively high voltage level which reduces voltage drops, motor drives as wells as motor and cable dimensions.
2) The single DC bus is configured to distribute power to the various power consuming units of the entire wind turbine. In terms of implementation the single DC bus of the wind turbine is very simple thus reducing the complexity of hardware/software installations within the wind turbine as well as reducing the installation costs.
3) The power backup system of the present invention allows handling of significant higher power levels (both nominal and peak) as no DC/DC/AC boosters are incorporated.
4) By operating the single bus as a DC bus, and applying variable frequency drive AC motors, the need for AC-DC-AC inverters is eliminated. With no such AC-DC-AC inverters installed, inverting losses are significantly reduced, and as a consequence, the efficiency and backup time of the power backup system is increased.

The power storage module may comprise a first string of series connected power storage units. The power storage module may further comprise a second string of series connected power storage units, which like the first string of series connected storage units provides a total backup voltage that falls within the nominal voltage range of the internal power supply grid of the wind turbine. The power storage module may further comprise additional strings of series connected power storage units. It is advantageous to apply a plurality of strings of series connected power storage units in that the reliability of the power backup system is increased via redundancy where one string of series connected power storage units may take over from another string of series connected power storage units in case of failure.

In order to provide a redundant power backup system the first and second strings of series connected power storage units may be connected in parallel.

Each power storage unit may comprise a plurality of series connected power cells, wherein each power storage unit has nominal terminal voltage within the range 40-60 V DC, such as around 50 V DC. The power cells may be selected from the group consisting of: lead-acid batteries, lithium-ion batteries, nickel metal hydride batteries and fuel cells. The plurality of power cells of a given power storage unit may be identical power cells having identical terminal voltages. Moreover, the plurality of power cells may be rechargeable power cells.

The power backup system may further comprise a controller for each string of series connected power storage units, said controller being adapted to connect the string of power storage units to the internal power supply grid during the grid fault, i.e. during the grid loss or the temporary voltage drop. The controller may further be adapted to disconnect the string of power storage units from the internal power supply grid when the grid connection has been reestablished and/or when the string of series connected power storage units has been fully charged.

As already addressed the internal power supply grid of the wind turbine to which the power backup system is directly connected comprises only a single DC bus being configured to operate at a relatively high voltage level. More particularly, the nominal voltage range of the internal power supply grid of the wind turbine may be within the range 400-1000 V DC, such as within the range 400-600 V DC, such as within the range 400-450 V DC and/or 450-560 V DC, whereby voltage drops, motor drives as wells as motor and cable dimensions may be reduced.

As the power backup system of the present invention comprises a power storage module providing a total backup voltage that falls within a nominal voltage range of the internal power supply grid of the wind turbine, the power backup system may be adapted to supply power directly to the internal power supply grid of the wind turbine during the grid fault, i.e. during the grid loss or the temporary voltage drop. By "directly" is meant that the voltage level provided by a given string of series connected power storage units is not modified so that the voltage level of the internal power supply grid is given by the voltage level of the power storage module. Thus neither passive nor controllable voltage adjusting devices, such as for example voltage boosters, are inserted in the connection between the power storage module and the internal power supply grid.

The wind turbine according to the first aspect may further comprise a sensor arrangement for detecting a grid fault, i.e. detecting a grid loss or a temporary voltage drop. This sensor arrangement may be a voltage, current and/or power sensor adapted to detect one or more of these electrical parameters at a point of common coupling (PCC) or at a point of measurement (PoM).

The wind turbine may further comprise a power supply module for providing power to the power consuming units of the wind turbine and/or charging the power backup system during normal operating conditions. Thus, the power supply module may, during normal operating conditions where the wind turbine is connected to the grid, supply power to the power consuming units of the wind turbine, and optionally charge power backup system if this is needed. If the power backup system is already fully charged it may be disconnected from the internal power supply grid so that the power supply module only powers the power consuming units of the wind turbine.

The wind turbine may further comprise a wind turbine controller adapted to disconnect selected power consuming units from the internal power supply grid of the wind turbine during the grid fault, i.e. during the grid loss or the temporary voltage drop in order to save energy/power. Such selected power consuming units may involve critical control mechanisms such as for example control systems, yawing, lubrication and pitching.

In a second aspect the present invention relates to a power backup system for a wind turbine comprising an internal power supply grid for distributing power to a number of power consuming units of the wind turbine, the power backup system being adapted to supply power to the internal power supply grid during a grid fault, wherein the power backup system comprises a power storage module providing a total backup voltage that falls within a nominal voltage range of the internal power supply grid of the wind turbine.

As already discussed in relation to the first aspect of the present invention the nominal voltage range of the internal power supply grid of the wind turbine may be within the range 400-1000 V DC, such as within the range 400-600 V DC, such as within the range 450-560 V DC. The power storage module of the power backup system may thus provide a total backup voltage within this voltage range As previously discussed, the power storage module of the power backup system may comprise a first string of series connected power storage units. Moreover, a second string of series connected power storage units may be provided. The first and second strings of series connected power storage units may be connected in parallel thus forming a redundant system.

Each power storage unit may comprise a plurality of series connected power cells, and wherein each power storage unit has nominal terminal voltage within the range 40-60 V DC, such as around 50 V DC. The power cells may be selected from the group consisting of: lead-acid batteries, lithium-ion batteries, nickel metal hydride batteries and fuel cells.

The power backup system may further comprise a controller for each string of series connected power storage units, said controller being adapted to connect/disconnect the string of power storage units to the internal power supply grid.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
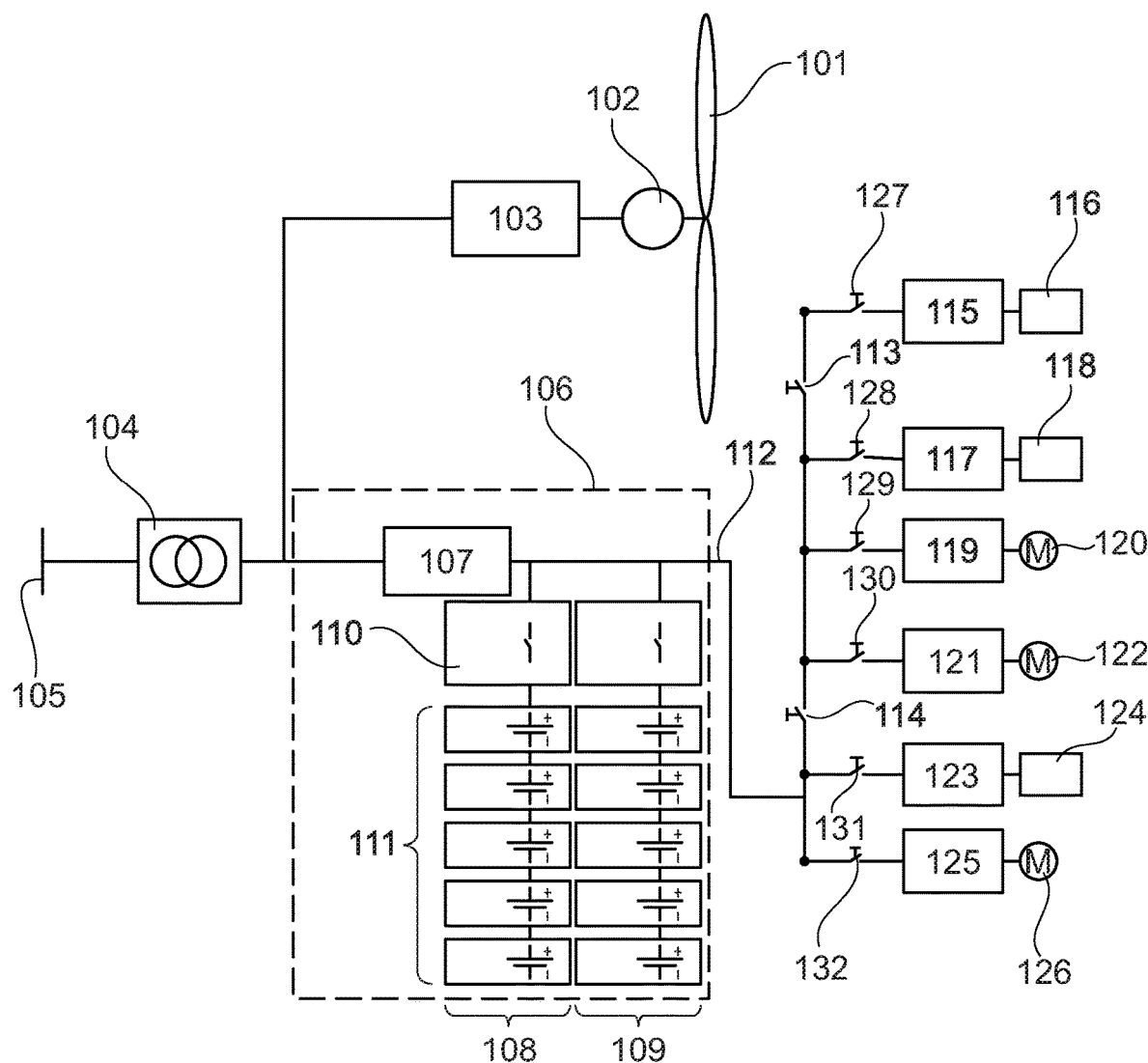
FIG. 1 shows a wind turbine comprising a power backup system according to the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF EMBODIMENTS

In a general aspect the present invention relates to a power backup system for supplying power to an internal power supply grid of a wind turbine during a grid fault, such as during a grid loss or a temporary voltage drop. The power backup system comprises a power storage module comprising one or more stacked, i.e. series connected, power storage units providing a total backup voltage that falls within a nominal voltage range of the internal power supply grid of the wind turbine. The total backup voltage refers to the output voltage of the power storage module, which in the embodiment of the series connected power storage units, is the aggregate output voltage of the connected power storage units, which for series connected power storage units is the sum of the individual output voltage of the power storage units. As the total backup voltage falls within the nominal voltage range of the internal power supply grid, the power backup system is directly connected to the internal power supply grid of the wind turbine. Thus, no voltage adjusting devices, such as voltage boosters and/or various inverter configurations, are required which is highly advantageous in that such devices introduce switching losses as well as connection delays in the event of a grid fault, i.e. a grid loss or a temporary voltage drop. The present invention also relates to a wind turbine comprising such a power backup system.

Referring now to FIG. 1 selected components of a wind turbine is depicted. As depicted in FIG. 1 a set of rotor blades 101 drives a generator 102 via an optional gear box (not shown) whereby wind energy may be converted to electrical energy. The power generated by the generator 102 is provided to a power converter 103 which may be a full-scale power converter. It should be noted that the generator may alternatively be a doubly-fed induction generator (DFIG) having a power converter connected to its rotor. Before reaching the utility grid 105 the power from the power converter 103 (typically around 640 V AC) is passed through a high-voltage transformer 104.

The wind turbine comprises an internal power supply grid 112 for supplying power to various power consuming units of the wind turbine. The internal power supply grid 112 forms a common DC bus within the wind turbine, said common DC bus being configured to be operated at a single and a relatively high voltage level in order to reduce installations costs, due to reduced cable dimensions, and reduce power losses. The power consuming units of the wind turbine may for example involve a wind turbine hub controller 116, a wind turbine nacelle controller 118 and a wind turbine tower controller 124 including respective power supply units 115, 117 and 123. Each power supply unit 115, 117, 123 is configured to provide an adjustable output voltage in the range 24-560 V DC. Moreover, respective circuit breakers 127, 128, 131 may disconnect and/or connect the power supply units 115, 117, 123 from the internal power supply grid 112. Also, various AC motors 120, 122, 126 including associated variable frequency drivers 119, 121, 125 and circuit breakers 129, 130, 132 are depicted in FIG. 1. The AC motors may be used for different purposes including yawing of the nacelle. Additional circuit breakers 113, 114 for electrically disconnecting and/or connecting the entire hub and/or the entire nacelle, respectively, are also depicted in FIG. 1.

The various circuit breakers 113, 114 and 127-132 are all controlled by a wind turbine controller adapted to connect and/or disconnect selected power consuming units from the internal power supply grid in response to various requirements, such as in order to save energy/power.

Still referring to FIG. 1 the power backup system is marked with the dashed line 106. The power backup system 106 comprises a first 108 and a second 109 power storage module each providing a total backup voltage that falls within a nominal voltage range of the internal power supply grid 112. Since the total backup voltage of the first 108 and second 109 power storage modules match the nominal voltage range of the internal power supply grid 112 the power backup system 106 may supply power directly to the internal power supply grid 112 without any voltage adjusting devices, such as voltage boosters and/or various inverter configurations. Typically, the nominal voltage range of the internal power supply grid 112 is within the range 400-1000 V DC.

Each of the two power storage modules 108, 109 comprises a string of series connected power storage units 111. The number of power storage units in each string is in principle determined by the ratio between the nominal voltage range of the internal power supply grid 112 and the nominal terminal voltage of each of the power storage units 111. For example, if the nominal terminal voltage of each of the power storage units 111 is around 48-50 V DC a total of 10 or 11 power storage units 111 are required in order to match an internal power supply grid voltage of 450-560 V DC. Optionally, further power storage units 111 may be included in one or both strings as well so as to have spare power storage units at hand if required. For illustrative and simplicity reasons each power storage module 108, 109 in FIG. 1 comprises a string of only five series connected power storage units 111.

The two power storage modules 108, 109, and thereby the first and second strings of series connected power storage units 111, are connected in parallel thereby providing a redundant power backup system where one power storage module may replace another power storage module in case of failure. It should be noted that further power storage modules each comprising a string of series connected power storage units may optionally be connected in parallel to the power storage modules 108, 109 depicted in FIG. 1.

Each of the power storage units 111 comprises a plurality of series connected power cells which may be selected from the group consisting of: lead-acid batteries, lithium-ion batteries, nickel metal hydride batteries and fuel cells. In case the power cells are batteries these batteries are rechargeable batteries.

Each of the power storage modules 108, 109 depicted in FIG. 1 are operatively connected to the internal power supply grid 112 via a circuit breaker 110 the status of which is controlled by the wind turbine controller (not shown). During normal operating conditions, i.e. the wind turbine is connected to the utility grid 105, the power storage modules 108, 109 are charged by the power supply module 107 which also, during normal operating conditions, provides power to the various power consuming units of the wind turbine. An additional transformer (not shown) may be provided in front of the power supply module 107 so that the input voltage to the power supply module 107 becomes around 400 V AC. During charging of the power storage modules 108, 109 the circuit breakers 110 are closed. When the power storage modules 108, 109 are fully changed the circuit breakers 110 may optionally be opened. In case of a detected grid loss, i.e. the connection to the utility grid 105 is lost, or a temporary voltage drop at least one of the circuit breakers 110 is closed (if it is not already closed) so that power from at least one of the power storage modules 108, 109 may instantaneously be supplied to the internal power supply grid 112. A grid loss or a temporary voltage drop may be detected in various ways, such as a detected voltage, current or power change at the PCC or PoM.

In order to save power/energy it may be advantageous that only critical power consuming units of the wind turbine are powered during a grid fault, i.e. during a grid loss or a temporary voltage drop. Such critical power consuming units may for example comprise control systems, the pitching mechanism, the lubrication mechanism and the yawing mechanism. Typically, the wind turbine controller is responsible for deciding whether only critical power consumers are to be powered during a grid fault.

The capacity of the power backup system is sufficient to supply the necessary amount of power to at least the critical power consuming units of the wind turbine for at least a few minutes, a few hours or even up to a few days. In order to extend this period of time a separate charger for charging the power backup system while the wind turbine is idling during a grid fault, i.e. during a grid loss, is provided, cf. FIG. 2.

Figure 2:
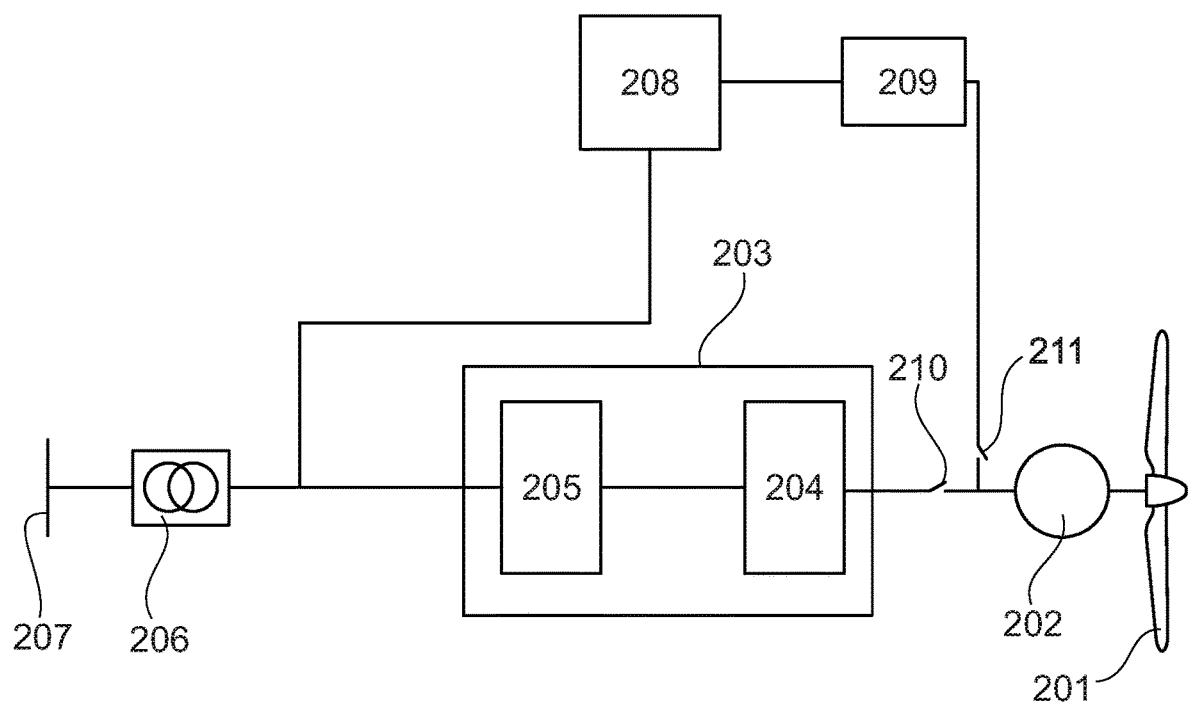
FIG. 2 shows a high-level block diagram of a wind turbine capable of charging the power backup system during an idling mode of operation.

Referring now to FIG. 2 selected components of a wind turbine are depicted again. As seen in FIG. 2 a set of rotor blades 201 drives a generator 202 via an optional gear box (not shown). The power generated by the generator 202 is provided to a power converter 203 which is depicted as a full-scale power converter comprising a generator-side inverter 204 and a grid-side inverter 205. It should be noted that the generator may alternatively be a doubly-fed induction generator (DFIG) having a power converter connected to its rotor. Before being injected into the utility grid 207 the power from the power converter 203 is passed through a high-voltage transformer 206. An additional transformer (not shown) may be provided between the grid-side inverter 205 and the high-voltage transformer 206.

During normal operating conditions, i.e. no grid loss or no temporary voltage drop, circuit breaker 210 is closed (and circuit breaker 211 is open) whereby power generated by the generator 202 may be provided to the utility grid 207. Moreover, the power backup system 208 (corresponding to reference numeral 106 in FIG. 1) is powered/charged with power from the full-scale power converter 203.

In case of a grid fault, i.e. a grid loss or a temporary voltage drop the power backup system 208 powers at least the critical power consuming units of the wind turbine for a certain period of time. In case the grid connection for some reason cannot be reestablished the wind turbine is brought into an idling mode of operation, and the circuit breaker 210 is opened. Since the wind turbine is still idling the generator 202 generates a small amount of power. By closing the circuit breaker 211 and inserting a converter 209 in the power path between the generator 202 and the power backup system 208, this small amount of power may be used to charge the power backup system 208 until the grid connection is reestablished.

The invention claimed is:

1. A wind turbine comprising:
an internal power supply grid for distributing power to a number of power consuming units of the wind turbine; and
a power backup system connected to the internal power supply grid for supplying power to said internal power supply grid during a grid fault, wherein the power backup system comprises a plurality of series connected power storage units that provide a total backup voltage that falls within a nominal voltage range of the internal power supply grid such that a voltage level of the total backup voltage from the plurality of series connected power storage units is unmodified when provided by the power backup system to the internal power supply grid.

2. The wind turbine according to claim 1, wherein the plurality of series connected power storage units comprises a first string of series connected power storage units and a second string of series connected power storage units, wherein the first string is connected in parallel with the and second string.

3. The wind turbine according to claim 1, wherein each power storage unit comprises a plurality of series connected power cells, and wherein each power storage unit has nominal terminal voltage within the range 40-60 V DC.

4. The wind turbine according to claim 3, wherein the power cells are selected from the group consisting of: lead-acid batteries, lithium-ion batteries, nickel metal hydride batteries and fuel cells.

5. The wind turbine according to claim 1, wherein the power backup system further comprises a plurality of controllers for the plurality of series connected power storage units, said controllers being adapted to connect the plurality of series connected power storage units to the internal power supply grid during the grid fault.

6. The wind turbine according to claim 1, wherein the nominal voltage range of the internal power supply grid of the wind turbine is within the range 400-1000 V DC.

7. The wind turbine according to claim 1, further comprising a sensor arrangement for detecting a grid fault.

8. The wind turbine according to claim 1, further comprising a power supply module for providing power to the power consuming units of the wind turbine or for charging the power backup system during normal operating conditions.

9. The wind turbine according to claim 1, further comprising a wind turbine controller adapted to disconnect selected power consuming units from the internal power supply grid of the wind turbine during the grid fault.

10. A power backup system for a wind turbine comprising:
an internal power supply grid for distributing power to a number of power consuming units of the wind turbine, the power backup system being adapted to supply power to the internal power supply grid during a grid fault; and
a power storage module comprising a plurality of series connected power storage units that provide a total backup voltage to the internal power supply grid during the grid fault, wherein the total backup voltage falls within a nominal voltage range of the internal power supply grid, and wherein a voltage level of the total backup voltage from the plurality of series connected power storage units is unmodified when provided by the power backup system to the internal power supply grid of the wind.

11. The power backup system according to claim 10, wherein the total backup voltage of the power storage module is within the range 400-1000 V DC.

12. The power backup system according to claim 10, wherein the plurality of series connected power storage units comprises a first string of series connected power storage units and a second string of series connected power storage units, wherein the first string is connected in parallel with the second string.

13. The power backup system according to claim 10, wherein each power storage unit comprises a plurality of series connected power cells, and wherein each power storage unit has nominal terminal voltage within the range 40-60 V DC.

14. The power backup system according to claim 13, wherein the power cells are selected from the group consisting of: lead-acid batteries, lithium-ion batteries, nickel metal hydride batteries and fuel cells.

15. The power backup system according to claim 10, wherein the power backup system further comprises a plurality of controllers for the plurality of series connected power storage units, said controllers being adapted to connect the plurality of series connected power storage units to the internal power supply grid during the grid fault.

* * * * *